(12) United States Patent
Masquelier

(10) Patent No.: US 7,283,806 B2
(45) Date of Patent: Oct. 16, 2007

(54) WIRELESS SENSING SYSTEM AND METHOD

(75) Inventor: Michael P. Masquelier, Los Alamos, NM (US)

(73) Assignee: Motorola, Inc., Schaumburg, IL (US)

( * ) Notice: Subject to any disclaimer, the term of this patent is extended or adjusted under 35 U.S.C. 154(b) by 96 days.

(21) Appl. No.: 11/114,993

(22) Filed: Apr. 25, 2005

(65) Prior Publication Data

US 2006/0240807 A1    Oct. 26, 2006

(51) Int. Cl.
*H04M 1/663* (2006.01)
*H04M 1/725* (2006.01)
*H04Q 7/22* (2006.01)

(52) U.S. Cl. ............ 455/412.2; 455/418; 455/419; 455/41.2; 455/41.3; 73/865.8; 73/802; 73/803; 324/529; 324/530; 324/531

(58) Field of Classification Search ............ 455/412.2, 455/418, 419, 41.2, 41.3; 73/865.8, 802, 73/803; 324/529, 530, 531
See application file for complete search history.

(56) References Cited

U.S. PATENT DOCUMENTS

| | | | |
|---|---|---|---|
| 5,199,575 A | * | 4/1993 | McHugh .................. 209/522 |
| 5,770,800 A | * | 6/1998 | Jenkins et al. ............. 73/623 |
| 6,041,646 A | * | 3/2000 | Fenlon ..................... 73/49.3 |
| 6,378,387 B1 | * | 4/2002 | Froom .................... 73/865.8 |
| 6,911,826 B2 | * | 6/2005 | Plotnikov et al. .......... 324/529 |
| 2003/0089183 A1 | * | 5/2003 | Jacobsen et al. ......... 73/865.8 |
| 2004/0245315 A1 | * | 12/2004 | Maev et al. ................ 228/8 |

OTHER PUBLICATIONS

Charles R. Farrar et al., Coupling Sensing Hardware With Data Interrogation Software For Strutural Health Monitoring, Proceedings of the XI DINAME, Feb.28-Mar. 4, 2005, Ouro Preto—MG—Brazil.

* cited by examiner

*Primary Examiner*—Steve M. D'Agosta

(57) ABSTRACT

An apparatus and method is provided for sensing data relating to a structure (14), including an inspection site sensor system having at least one microprocessor (16) coupled to the structure. At least one sensor (12) for sensing data is connected to each of the at least one microprocessors that compare the data to a standard. A user interface (18) is coupled to the microprocessor (16) for presenting the comparison, and a wireless transmitter (20) is coupled to the microprocessor (16) for transmitting at least one of the data and the comparison to a management site (22). The management site (22) includes a receiver (24) for receiving the transmitted at least one of the data and the comparison, a microprocessor (26) coupled to the receiver (24); and a user interface (28) coupled to the microprocessor (26).

4 Claims, 3 Drawing Sheets

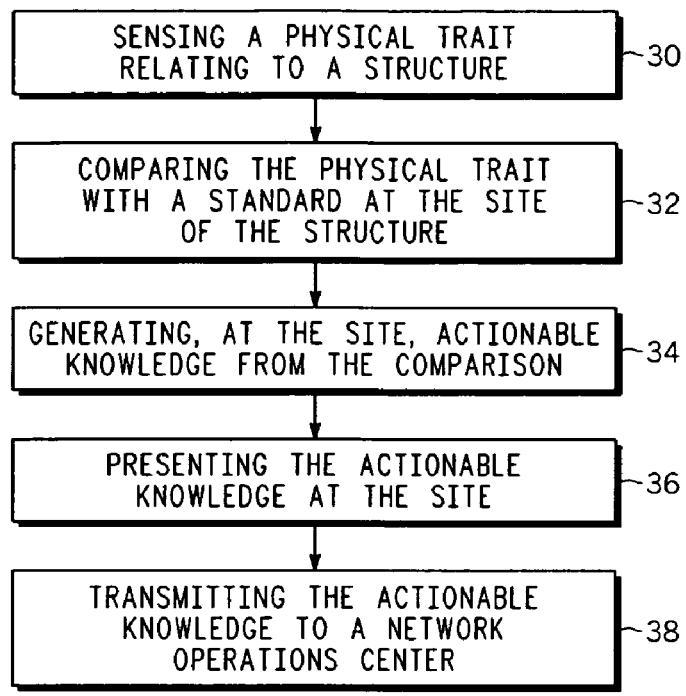
FIG. 2
FIG. 3
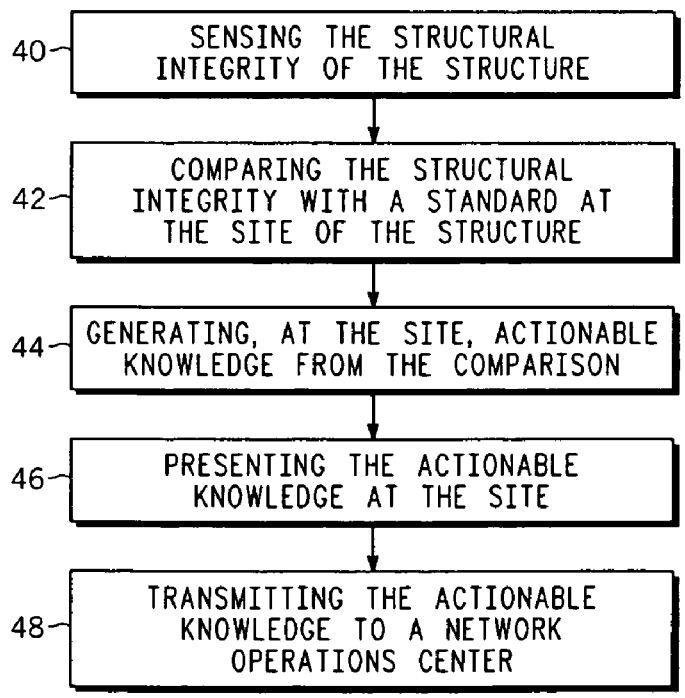

WIRELESS SENSING SYSTEM AND METHOD

FIELD OF THE INVENTION

The present invention generally relates to a wireless sensing system, and more particularly to a system and method for sensing and presenting data.

BACKGROUND OF THE INVENTION

There are many applications for wireless communication networks, such as wireless sensors; industrial control and monitoring; intelligent agriculture, asset and inventory tracking; and security. Typical wireless sensing systems comprise sensors that passively gather large amounts of data from an environment, which is typically sent via wires to a host node for evaluation by an individual specifically trained to manually evaluate the information as time permits. This typical sensor system sometimes includes conversion of the signal from analog to digital and/or signal conditioning. The raw time-series data is typically transmitted in its entirety to a host node where it is sometimes stored indefinitely and analyzed very infrequently.

A conventional system comprises a plurality of sensors coupled to an interface which sends the information via a wired, large bandwidth transmission to a computer at a remote location. Installation of the wires themselves are either cost-prohibitive due to the distances over which the wires must pass, or infeasible in many other situations due to the environment where the sensor itself and respective wiring are located. This low-power wireless technology has proved to be an enabler for wireless sensing in areas that were previously unattainable, due to the 'difficult-to-reach' or 'difficult-to-wire' nature of the installation or retrofit process. Alternatively, the raw data may be sent via a large bandwidth wireless system, but this would consume significant amounts of power and create unnecessary network traffic.

Accordingly, it is desirable to provide a system and method for sensing and presenting data. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus and method is provided for sensing data related to a structure, the apparatus comprising an inspection site sensor system having at least one microprocessor coupled to the structure. At least one sensor for sensing data is connected to each of the at least one microprocessors that compare the data to a standard. A user interface is coupled to the microprocessors for presenting the comparison at the inspection site, and a wireless transmitter is coupled to the microprocessors for transmitting at least one of the data and the comparison to a management site.

BRIEF DESCRIPTION OF THE DRAWINGS

The present invention will hereinafter be described in conjunction with the following drawing figures, wherein like numerals denote like elements.

FIG. 2 is a flow chart depicting a general embodiment of the present invention;

FIG. 3 is a flow chart depicting a first specific embodiment of the present invention;

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

In a general embodiment, a wireless sensing system is disclosed that is able to generate actionable knowledge created at the point of data collection from the sensor by identifying a specific feature that is indicative of damage, for example, and comparing to a local standard that reflects the expected signature of a healthy structure. This allows the system integrity information to be discerned and displayed at each local sensor node, as well as the local host node that also resides on or adjacent to the structure. This information could then be acted upon by a local inspector or first responder, for example, without specific knowledge of the metrics that govern the integrity of the local asset, thereby facilitating immediate assessment of the environment or asset. In the case of a civil infrastructure asset, this metric would be inhabitability or usability of a given structure. This would both reduce the potential life safety risks and more quickly identify the viability of a given asset. This approach not only allows a local inspector to detect that there has been a significant state change in the system of interest, but also allows localization of the damage or contamination.

Figure 1:
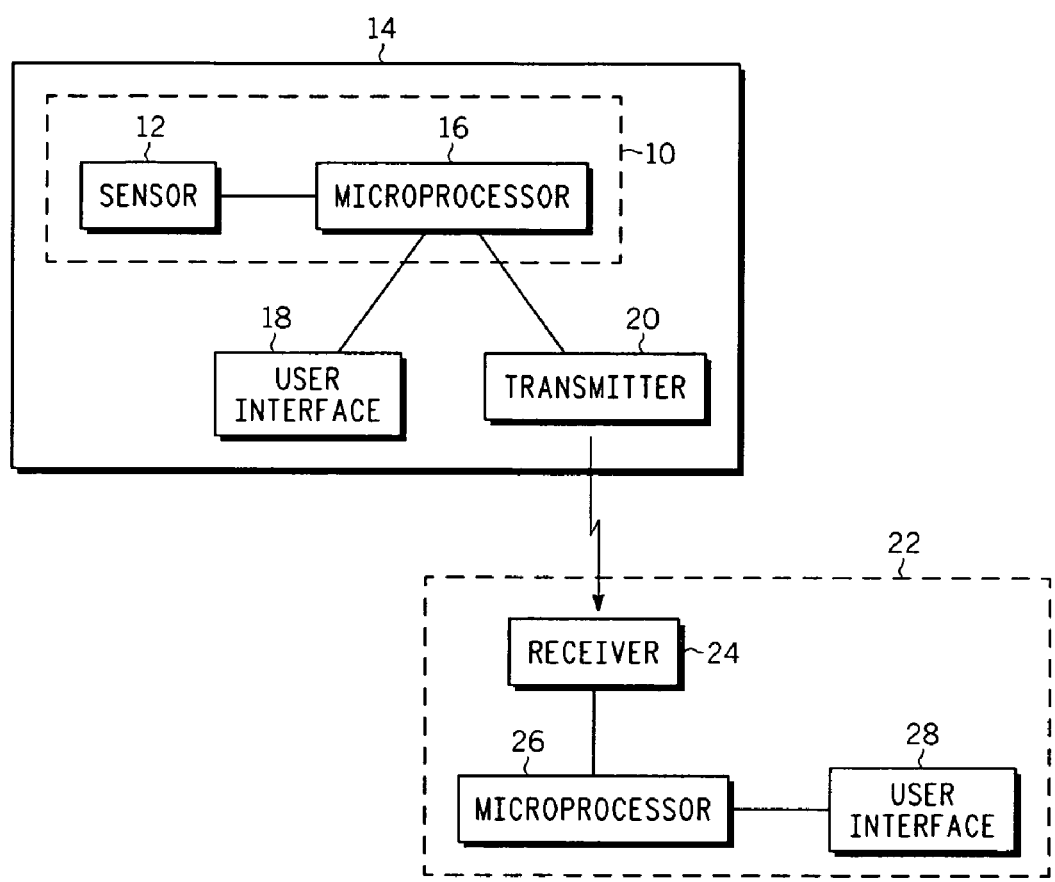
FIG. 1 is a block diagram of an embodiment of the present invention.

Referring to FIG. 1, a local sensor node 10 includes a sensor 12, positioned in or on the structure 14 of the disclosed embodiment (three examples of how the embodiment may be used are described hereinafter), that passes data sensed thereby to a microprocessor 16 (or a digital signal processor). The sensor 12 may be coupled to the microprocessor 16 either by wire or by RF signal, for example. The sensor 12 may include any type known in the industry, such as temperature, vibration, or radiation sensors. Although only one sensor is shown, any number of sensors 12 may be coupled to the microprocessor 16. Additional microprocessors 16 may also be used to more accurately process the information received from one or more sensors 12. Furthermore, a digital-to-analog or analog-to-digital converter (not shown) may be coupled between the sensor 12 and microprocessor 16.

A user interface 18 is coupled to the microprocessor 16 for providing information to a user. The user interface 18 may comprise, for example, a computer such as a laptop, a visual display, or simply a plug for receiving a computer hookup. A transmitter 20 receives the information from the microprocessor 16 and transmits the information from the local sensor node 10 to a network operations center 22.

The IEEE 802.15 (Wireless Personal Area Networks—WPAN) or 802.11 (Wireless Local Area Networks—WLAN) protocol specifications may be used by transmitter 20 for communicating information between multiple sensor nodes 10, but can also be used for communication between structure 14 and the network operations center 22 or an intermediate host or data aggregator. The 802.15.4 WPAN Medium Access Control (MAC) and Physical Layer (PHY) specifications for Low Rate Wireless Personal Area Networks (LR-WPANs) is the preferred protocol.

The network operations center 22 comprises a receiver 24 for receiving the transmission from the local sensor node 10, and forwarding the information to a microprocessor 26. A user interface 28 is coupled to the microprocessor 26 for providing the information to a user and for the user to input specifications, etc.

The wireless sensor apparatus 10 generates actionable knowledge where it is needed (at the location or site of the item/event being sensed), reduces network bandwidth requirements, minimizes power consumption, and optionally extends data collection distances by utilization of the multi-hop capabilities of the IEEE 802.15.4 or Zigbee-based network. Multi-hop refers to the capability within the communications protocol for the nodes to self-organize and the ability to send information gathered at a more distant node back to the host, via an intermediate node, thus extending the effective "distance" of the network, and allows identification of the specific position where damage to a structure has occurred.

Referring to FIG. 2, a method of implementing the apparatus of FIG. 1 is shown. A physical trait relating to the structure 14 is sensed 30 and compared 32 with a standard at the site of the structure 14. Actionable knowledge is then generated 34 at the site from the comparison 32, and presented 36 at the site. Furthermore, the actionable knowledge is transmitted 38 from the site to a network operations center 22.

While many embodiments of the present invention may exist, three will be presented hereinafter as examples of how the wireless sensor apparatus may be implemented. These examples include 1) a bridge over a river or road, but could include buildings, amusement park rides, railway systems, aerospace systems, motors, pumps, or engines, for example; 2) a shipping container, such as large containers transported by rail or ship; and 3) a food supply monitoring and tracking system. Other examples include wildfire management, telehealth, etc.

In reference to the first specific embodiment, approximately twenty eight percent of the bridges in the aging United States civil infrastructure are considered deficient, presenting a significant life safety problem and estimated cost to repair would be $200,000,000,000 if performed today according to the National Bridge Inventory. The current inspection method comprises random bi-annual manual inspection of the structures, with an occasional concrete core sample taken of a very small area to look for corrosion or delamination. The detection of damage in the civil infrastructure, such as bridges, buildings and roads, prior to the onset of a failure can be accomplished by the wireless integrated structural health monitoring system embodiment shown in the figure. This system would reduce liabilities due to a potential loss of human life, assess the damage of the structure in real-time and avoid "loss-of-use" assertions, and perhaps reduce the insurance cost. This embodiment shifts the maintenance schedule for such structures from being "time-based" to "condition-based". Significant cost savings can be enabled by labor savings due to a reduced maintenance and inspection frequency, reduced factory or system downtime due to a reduced rate of equipment failure, and lower operating costs due to reduced spare parts inventory and usage.

Acceleration sensors 12 placed on structures with embedded microcontrollers 16 enable generation of structural integrity knowledge at each local node. Referring to FIG. 3 and in accordance with a first specific embodiment, structural integrity of relating to the structure 14, which may be, for example, a bridge, road, or building, is sensed 40 and compared 42 with a standard at the site of the structure 14. Actionable knowledge is then generated 44 at the site from the comparison 42, and presented 46 at the site. Furthermore, the actionable knowledge is transmitted 48 from the site to a network operations center 22.

Referencing the second specific embodiment, according to the CSI Institute: 1) about 7.8 million loaded containers enter United States seaports annually and fewer than two percent, and a smaller percentage of export loads, are subjected to full inspections; 2) stopping a container in transit, processing the necessary paperwork and inspecting it by hand takes five customs officers three hours; and 3) an inspection station using state of the art mobile scanners requires fewer people and can process up to eleven containers an hour. Electronic seals have been tested on containers moving from Japan through Seattle and on to Canada as part of the Department of Transportation's Intelligent Transportation Systems (ITS) program; however, they do not provide enhanced security above the current manual high security "barrier" type bolt seals, which also carry unique identification, and the issue remains that seals and other such initiatives do not provide information on what is inside the container (CSI Insitute). The wireless sensor apparatus 10 positioned within the containers would provide additional information about the specific contents, detect tampering, and whether there are contents that might indicate terrorist activities (for example). Electronic seals have been tested on containers moving from Japan through Seattle and on to Canada as part of the DOT Intelligent Transportation systems (ITS) program. These seals, however, do not provide additional security beyond the current manual bolt seals that already provide a physical barrier. Both types contain unique identification of the container, but neither provide information about the contents inside the container. Sensors installed in accordance with the present invention within the containers would not only serve to provide additional information about the specific contents, but also would detect whether the container has been tampered with, and whether there are contents that might indicate terrorist activities. For example, a carbon dioxide sensor 12 could be used to detect the presence of a live human, or a plurality of RFID-type sensors 12 would identify rectify whether the contents match that which is listed on the container documents that required to be filed and verified prior to departure of the shipping vessel from a port.

Figure 4:
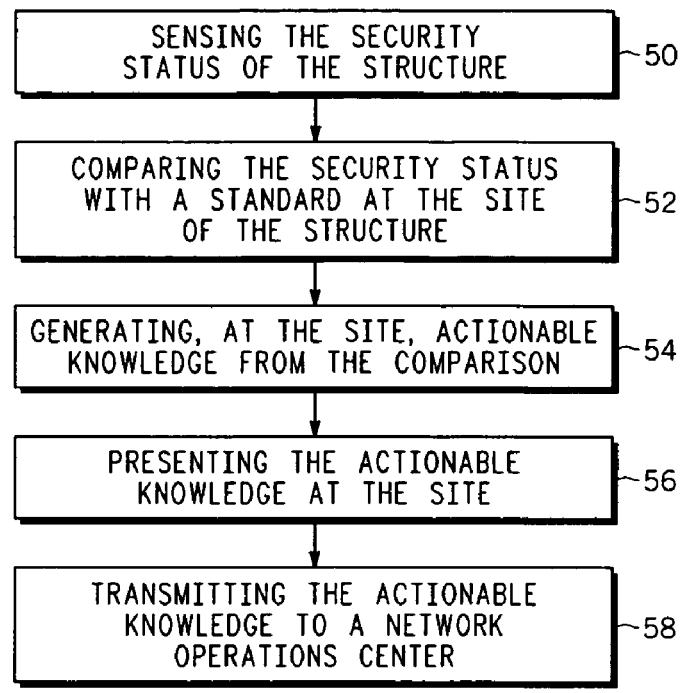
FIG. 4 is a flow chart depicting a second specific embodiment of the present invention.

Referring to FIG. 4 and in accordance with the second specific embodiment, the security status of a structure 14 such as a shipping container is sensed 50 and compared 52 with a standard at the site of the structure 14. The security status may, more specifically, relate to, for example, unapproved access to the container, items removed from the container, unusual forces applied against the container. Actionable knowledge is then generated 54 at the site from the comparison 52, and presented 56 at the site. Furthermore, the actionable knowledge is transmitted 58 from the site to a network operations center 22.

Referring to the third specific embodiment, in the annual planting, harvesting, and distribution of agricultural products, a significant amount of food is wasted due to the loss between "seed-to-table" due to the inability to either maximize crop yield per acre or due to spoilage caused by delays or improper storage conditions during transportation from field to market. Monitoring of the local soil moisture content can lead to increased crop yields. Placement of wireless sensors 12 on boxes 14 of harvested crops can serve to provide identification, as well as an indication of the climate and forces that have been endured during transportation. Actionable knowledge generated at the point of harvest and packing would reduce the wasted transportation costs incurred when continuing to move spoiled fruit or vegetables along the supply chain. By identifying crops at the farm location which are not suitable for consumption, these otherwise wasted items could be used to optimize the soil nutrient content by composting, and minimize the spoiled food which enters the landfills. Sensors within the containers provide information about specific contents, current quality level, and climate/forces endured during transportation, maximizing the product knowledge of a potential buyer and increases supply chain efficiencies.

In the case of food supply monitoring and tracking, this metric would be the spoilage or contamination of food within the container. Perishable products, such as food, have an extensive distribution trail from the grower, packer, distributor, and marketer, to the consumer. Each leg of the distribution trail between each stage requires close monitoring of the environment of the container in which the perishable food is stored. Measurables such as temperature, humidity, time in transit, vibrations, hard jolts, air quality, appearance, contents, and smell may need to be monitored. These measurables, optionally along with a comparison with a standard measure, provide actionable knowledge that would be important to an inspector at the site of the container. Furthermore, this actionable knowledge is transmitted to a network operations center, or management location, which may monitor hundreds, or even thousands, of containers.

Figure 5:
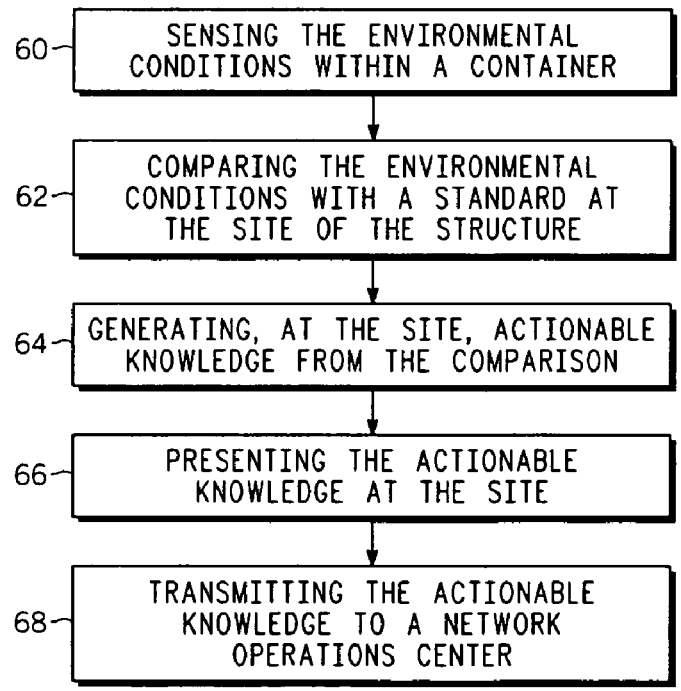
FIG. 5 is a flow chart depicting a third specific embodiment of the present invention.

Referring to FIG. 5 and in accordance with the second specific embodiment, the environmental conditions within a structure 14 such as a shipping container is sensed 60 and compared 62 with a standard at the site of the structure 14. The environmental conditions may, more specifically, relate to spoilage of food within the container. Actionable knowledge is then generated 64 at the site from the comparison 62, and presented 66 at the site. Furthermore, the actionable knowledge is transmitted 68 from the site to a network operations center 22.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method of sensing and presenting information comprising:

sensing a physical trait for determining the security status of a structure by a first node comprising a sensor contiguous to the structure, wherein the physical trait comprises at least one of vibrations, tensile strength, delamination, and corrosion, and the structure comprises one of a bridge, road, building, dam, aircraft, rotating machinery, and container;

comparing the physical trait with a standard stored within one of the first node and a second node, the second node comprising a microprocessor contiguous to the structure, the first and second nodes being spaced apart;

if the physical trait is compared with the standard in the first node, transmitting the comparison to the second node;

generating, by the microprocessor, actionable knowledge from the comparison;

optionally presenting the actionable knowledge by a first user interface within the first node;

presenting the actionable knowledge by a second user interface within the second node;

wirelessly transmitting the actionable knowledge from a transmitter contiguous to the structure to a network operations center;

presenting the actionable knowledge by a third user interface within the network operations center; and providing instructions to the user interface from one of the microprocessor or the network operations center in response to the actionable knowledge.

2. A method of sensing and presenting information comprising:

sensing a physical trait for determining the security status of a structure by a first node comprising a sensor contiguous to the structure, wherein the physical trait comprises an environmental condition pertinent to the structure, and the structure comprises one of a bridge, road, building, dam, aircraft, rotating machinery, and container;

comparing the physical trait with a standard stored within one of the first node and a second node, the second node comprising a microprocessor contiguous to the structure, the first and second nodes being spaced apart;

if the physical trait is compared with the standard in the first node, transmitting the comparison to the second node;

generating, by the microprocessor, actionable knowledge from the comparison;

optionally presenting the actionable knowledge by a first user interface within the first node;

presenting the actionable knowledge by a second user interface within the second node;

wirelessly transmitting the actionable knowledge from a transmitter contiguous to the structure to a network operations center;

presenting the actionable knowledge by a third user interface within the network operations center; and providing instructions to the user interface from one of the microprocessor or the network operations center in response to the actionable knowledge.

3. A method of sensing and presenting information comprising:

sensing a physical trait for determining the security status including structural integrity and environmental conditions of a structure by a first node comprising a sensor contiguous to the structure, to determine physical damage to food stored within the structure;

comparing the physical trait with a standard stored within one of the first node and a second node, the second node comprising a microprocessor contiguous to the structure, the first and second nodes being spaced apart;

if the physical trait is compared with the standard in the first node, transmitting the comparison to the second node;

generating, by the microprocessor, actionable knowledge from the comparison;
optionally presenting the actionable knowledge by a first user interface within the first node;
presenting the actionable knowledge by a second user interface within the second node;
wirelessly transmitting the actionable knowledge from a transmitter contiguous to the structure to a network operations center;

presenting the actionable knowledge by a third user interface within the network operations center; and
providing instructions to the user interface from one of the microprocessor or the network operations center in response to the actionable knowledge.

4. The method of claim 3 further comprising determining whether the physical damage to the food is due to spoilage.

* * * * *